United States Patent
Strubel et al.

(10) Patent No.: US 7,204,467 B2
(45) Date of Patent: Apr. 17, 2007

(54) LONGITUDINAL ADJUSTER FOR A VEHICLE SEAT

(75) Inventors: Peter Strubel, Flonheim (DE); Reinhard Goy, Kaiserslautern (DE); Ulf Schäffling, Gaugrehweiler (DE); Jürgen Krebs, Rockenhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 293 days.

(21) Appl. No.: 10/631,673

(22) Filed: Jul. 31, 2003

(65) Prior Publication Data

US 2005/0224680 A1 Oct. 13, 2005

(30) Foreign Application Priority Data

Aug. 7, 2002 (DE) ................. 102 36 067

(51) Int. Cl.
*F16M 13/00* (2006.01)

(52) U.S. Cl. ........................ 248/429; 248/424

(58) Field of Classification Search ........... 248/419, 248/424, 429, 430; 297/317.8, 322, 329
See application file for complete search history.

(56) References Cited

U.S. PATENT DOCUMENTS

| | | | |
|---|---|---|---|
| 2,780,501 A | 2/1957 | Rosenberg | |
| 3,899,151 A * | 8/1975 | Kobrehel | ............. 248/429 |
| 4,556,263 A | 12/1985 | Chevalier | |
| 4,711,589 A | 12/1987 | Goodbred | |
| 5,222,814 A | 6/1993 | Boelryk | |
| 5,370,350 A * | 12/1994 | Okano et al. | ............. 248/430 |
| 5,407,166 A | 4/1995 | Pilarski | |
| 5,718,477 A * | 2/1998 | Schuler | ............. 297/341 |
| 5,813,648 A | 9/1998 | Moradell et al. | |
| 5,816,555 A * | 10/1998 | Ito et al. | ............. 248/429 |
| 5,961,089 A * | 10/1999 | Soisnard | ............. 248/430 |
| 6,364,272 B1 | 4/2002 | Schüler et al. | |
| 6,435,465 B1 * | 8/2002 | Yamada et al. | ............. 248/429 |
| 6,648,291 B2 | 11/2003 | Krebs et al. | |
| 2003/0042386 A1 | 3/2003 | Krebs et al. | |
| 2003/0062462 A1 * | 4/2003 | Jost | ............. 248/430 |
| 2003/0085330 A1 * | 5/2003 | Lee | ............. 248/430 |

FOREIGN PATENT DOCUMENTS

| | | |
|---|---|---|
| DE | 41 05 231 A1 | 9/1992 |
| DE | 198 04 506 A1 | 8/1999 |
| DE | 199 22 294 A1 | 11/2000 |
| DE | 101 42 994 A1 | 3/2003 |
| EP | 0 090 701 A1 | 10/1983 |
| EP | 1 052 139 A2 | 11/2000 |
| EP | 1 052 139 B1 | 11/2000 |

* cited by examiner

*Primary Examiner*—Amy J. Sterling
(74) *Attorney, Agent, or Firm*—Womble Carlyle Sandridge & Rice, PLLC

(57) ABSTRACT

In a longitudinal adjuster (1) for a vehicle seat, in particular for an automobile seat, with a first seat rail (3), a second seat rail (4) adapted for sliding movement relative to the first seat rail (3), and an engagement member (8) arranged on the second seat rail (4), the first seat rail (3) includes a stop plate (15) with first stop surfaces. The first stop surfaces cooperate with second stop surfaces of the engagement member (8) for limiting the movement of the seat rail (3, 4).

16 Claims, 2 Drawing Sheets

LONGITUDINAL ADJUSTER FOR A VEHICLE SEAT

BACKGROUND OF THE INVENTION

The present invention relates to a longitudinal adjuster for a vehicle seat, in particular for an automobile seat, with the longitudinal adjuster including a first seat rail, a second seat rail adapted for sliding movement relative to the first seat rail, and an engagement member arranged on the second seat rail.

In a known longitudinal adjuster of the type described above, the engagement member assists in the mutual engagement of the seat rails. The maximum displacement of the second seat rail is limited by stops, for example, by the mounting screws of the seat rails.

BRIEF SUMMARY OF THE INVENTION

One aspect of the present invention is to improve a longitudinal adjuster of the type described above.

In accordance with one aspect of the present invention, a longitudinal adjuster for a vehicle seat, in particular for an automobile seat, has a first seat rail, a second seat rail adapted for sliding movement relative to the first seat rail, and an engagement member arranged on the second seat rail; and the first seat rail has a stop plate with first stop surfaces that cooperate with second stop surfaces of the engagement member for limiting the movement of the seat rail.

The fact that a first seat rail comprises a stop plate with first stop surfaces, which cooperate with second stop surfaces of the engagement member for limiting the movement of the seat rail, permits making available in a purposeful manner a stop that is independent of the positions of the mounting screws, in particular in a preferred embodiment, in which the stop surfaces extend in the transverse direction of the rails in offset relationship with the mounting points.

With that, it becomes possible to select the maximum displacement individually for the case of application, i.e., it is possible to realize different maximum displacements, without requiring that the production tools for the actual seat rail, which is preferably always the same, or the tools for the assembly be specially adjustable. For this purpose, one may select the separately made stop plate preferably from a set of different stop plates, and mount it with at least two different orientations to the first seat rail. For a simple manufacture of the stop plate and the engagement member, the stop surfaces are formed on laterally arranged, integral projections.

BRIEF DESCRIPTION OF THE DRAWINGS

Figure 1:
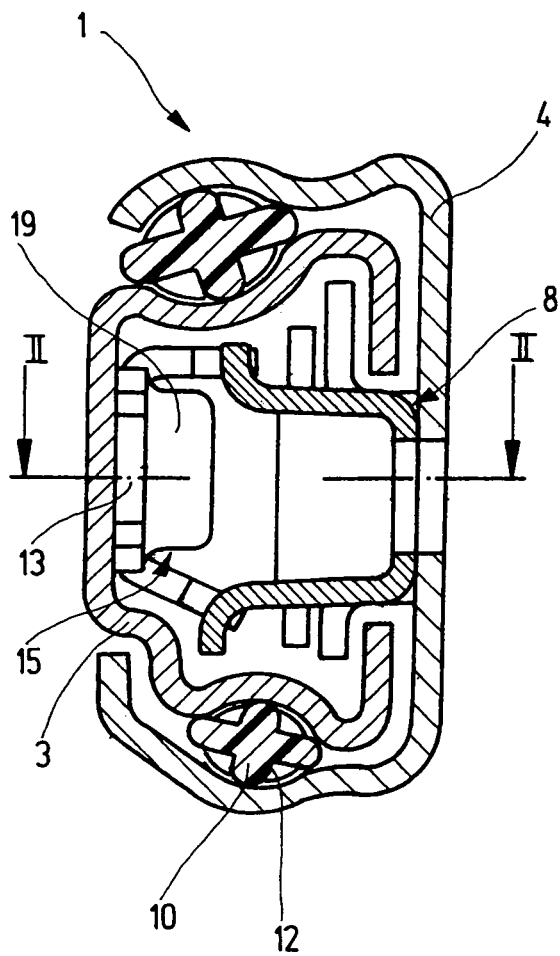
Figure 3:
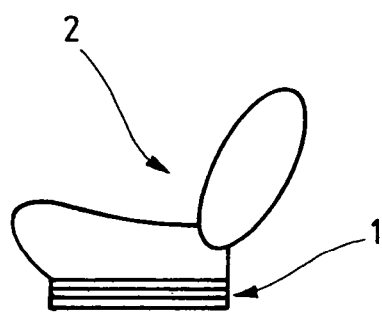
Figure 2:
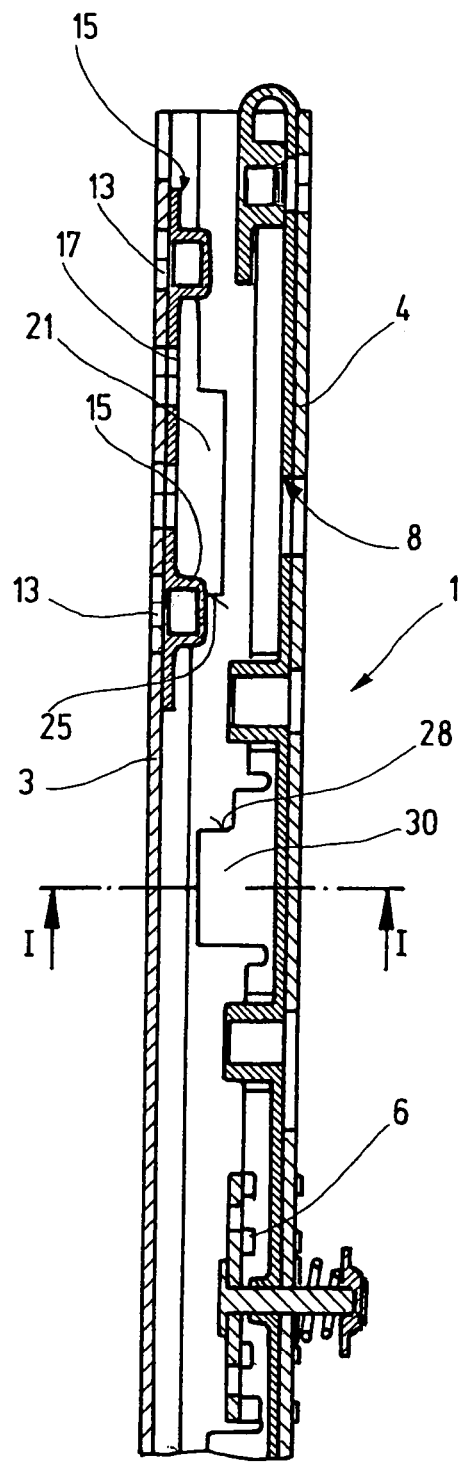
Figure 4A:
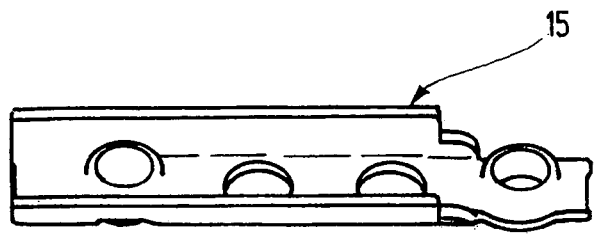
Figure 4B:
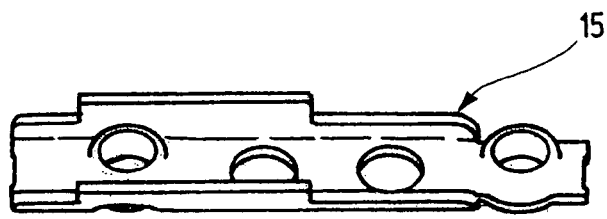
Figure 4C:
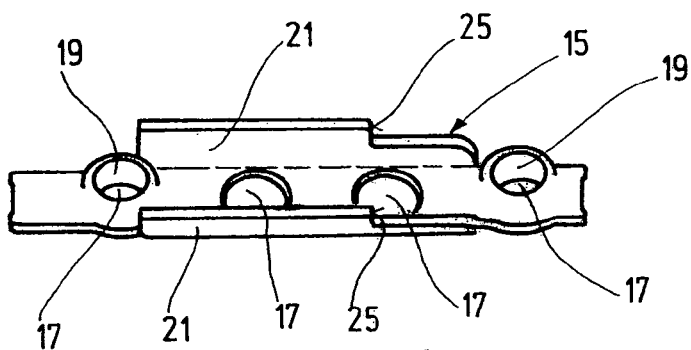
Figure 4D:
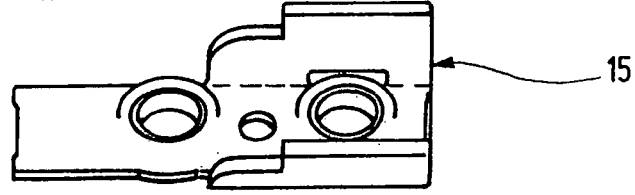
Figure 4E:
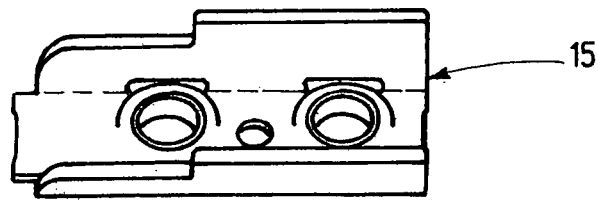
Figure 4F:
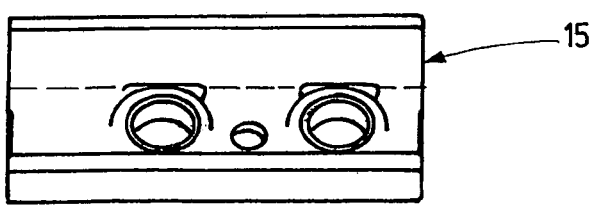

Having thus described the invention in general terms, reference will now be made to the accompanying drawings. In the following, the invention is described in greater detail with reference to an embodiment illustrated in the drawings, in which:

FIG. 1 is a cross sectional view of the embodiment along line I—I of FIG. 2;

FIG. 2 is lengthwise sectioned view of a portion of the embodiment, with the section taken along line II—II of FIG. 1;

FIG. 3 is a schematic view of a vehicle seat; and

FIGS. 4A–4F respectively illustrate several exemplary stop plates.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A longitudinal adjuster 1 for a lengthwise adjustable vehicle seat 2, in particular for an automobile seat, comprises on both sides of the vehicle seat 2 respectively a first seat rail 3 as a guide rail that is secured to the vehicle structure, and a second seat rail 4 as a slide rail that is secured to the seat structure. Each second seat rail 4 extends for sliding movement on the associated first seat rail 3 in the longitudinal direction of the rails, and is adapted for being releasably locked in different longitudinal seat positions of the vehicle seat 2 by means of a locking device 6. An engagement member 8 arranged on the second seat rail strengthens the mutual engagement of the two seat rails 3 and 4. Balls 12 arranged in ball cages 10 function so that friction between the two seat rails 3 and 4 is as small as reasonably possible during the displacement.

The first seat rail 3 is connected, preferably screwed, to the vehicle structure at mounting points 13, which are provided in the front and in the rear, when viewed in the longitudinal direction of the rails. For reinforcement in these mounting points 13 and as a stop during the displacement of the second seat rail 4, two stop plates 15 are provided, of which the rear stop plate 15 is described in greater detail in the following. For example, in the present embodiment, the elongate stop plate 15 includes, in the longitudinal direction of the rails, four successive attachment holes (e.g., screw holes 17), which are provided with an internal thread in the present embodiment. Two of these screw holes are formed in projections 19, which direct into the interior of the section formed by the two seat rails 3 and 4.

Along each of its two longitudinal edges, the stop plate 15 mounts projections 21 made integral therewith and including first stop surfaces 25 on their end face oriented in the longitudinal direction of the rails. The projections 21 with the first stop surfaces 25 may extend over the entire length of stop plate 15 or only over a part thereof, as shown in the present embodiment. The first stop surfaces 25 cooperate, as a final stop for the movement of the second seat rail 4, with second stop surfaces 28, which are formed on projections 30 of the engagement member 8 on the side directed in the longitudinal direction of the rails.

In the transverse direction of the rails, the first stop surfaces 25 and second stop surfaces 28 are arranged off center, i.e. in offset relationship with mounting points 13. For this reason, the second stop surfaces 28 will preferably never contact mounting means, such as screws or the like, which are screwed or otherwise inserted into holes 17 of mounting points 13. The front stop plate 15 essentially corresponds to the described rear stop plate 15, except that in the present embodiment, it is shorter and includes only three screw holes 17.

The two possible orientations of each stop plate 15 during the assembly, a selection of stop plates 15 from a set of stop plates 15 of a modular system as shown in FIG. 4, and the arrangement of the stop surfaces 25 and 28 in offset relationship with the mounting points 13 permit defining different maximum displacements of the second rail 4 and, with that, different longitudinal adjustment ranges irrespective of the mounting of the stop plate 15. It is therefore possible to use the longitudinal adjuster 1 for a plurality of vehicle seats 2 with little modification during the assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A longitudinal adjuster for a vehicle seat, the longitudinal adjuster comprising:
    an elongate first seat rail that extends in a longitudinal direction, an elongate second seat rail that extends in the longitudinal direction and is connected to the first seat rail for moving relative to the first seat rail in the longitudinal direction, and an engagement member that is arranged on the second seat rail, wherein
    the first seat rail includes a stop plate having first stop surfaces, the engagement member includes second stop surfaces,
    the first stop surfaces cooperate with the second stop surfaces to limit movement of the second seat rail relative to the first seat rail,
    the first seat rail and the second seat rail cooperatively extend around an interior space,
    the engagement member and the stop plate are positioned in the interior space,
    the engagement member strengthens mutual engagement of the second seat rail and the first seat rail,
    the stop plate includes projections, and the projections of the stop plate respectively include the first stop surfaces, and
    the engagement member includes projections, and the projections of the engagement member respectively include the second stop surfaces.

2. A longitudinal adjuster according to claim 1, wherein in a transverse direction, which is perpendicular to the longitudinal direction, the first and second stop surfaces are respectively at positions that are offset with respect to mounting points of the stop plate.

3. A longitudinal adjuster according to claim 2, wherein the stop plate is joined to the first seat rail at the mounting points.

4. A longitudinal adjuster according to claim 3, wherein the stop plate is secured to structure of the vehicle structure at the mounting points.

5. A longitudinal adjuster according to claim 1, wherein:
    the stop plate includes edges that extend in the longitudinal direction and are spaced apart from one another in a lateral direction;
    the lateral direction is perpendicular to the longitudinal direction;
    the projections of the stop plate respectively project from proximate the edges of the stop plate; and
    the stop plate defines attachment holes that are positioned between the edges of the stop plate and are successively arranged in the longitudinal direction.

6. A longitudinal adjuster according to claim 1, wherein the longitudinal adjuster is in combination with the vehicle seat, with the vehicle seat being mounted to the longitudinal adjuster so that positioning of the vehicle seat is adjustable in the longitudinal direction.

7. A longitudinal adjuster for a vehicle seat, the longitudinal adjuster comprising:
    an elongate first seat rail that extends in a longitudinal direction, an elongate second seat rail that extends in the longitudinal direction and is connected to the first seat rail for moving relative to the first seat rail in the longitudinal direction, and an engagement member that is arranged on the second seat rail, wherein
    the first seat rail includes a stop plate having first stop surfaces,
    the engagement member includes second stop surfaces,
    the first stop surfaces cooperate with the second stop surfaces to limit movement of the second seat rail relative to the first seat rail,
    the first seat rail and the second seat rail cooperatively extend around an interior space,
    the engagement member and the stop plate are positioned in the interior space,
    the engagement member strengthens mutual engagement of the second seat rail and the first seat rail,
    the engagement member includes projections that are spaced apart from one another in a lateral direction and respectively include the second stop surfaces, and
    the lateral direction is perpendicular to the longitudinal direction.

8. A longitudinal adjuster for a vehicle seat, the longitudinal adjuster comprising:
    an elongate first seat rail that extends in a longitudinal direction, an elongate second seat rail that extends in the longitudinal direction and is connected to the first seat rail for moving relative to the first seat rail in the longitudinal direction, and an engagement member that is arranged on the second seat rail, wherein
    the first seat rail includes a stop plate having first stop surfaces,
    the engagement member includes second stop surfaces,
    the first stop surfaces cooperate with the second stop surfaces to limit movement of the second seat rail relative to the first seat rail,
    the first seat rail and the second seat rail cooperatively extend around an interior space,
    the engagement member and the stop plate are positioned in the interior space,
    the engagement member strengthens mutual engagement of the second seat rail and the first seat rail,
    the stop plate includes projections that are spaced apart from one another in a lateral direction and respectively include the first stop surfaces, and
    the lateral direction is perpendicular to the longitudinal direction.

9. A longitudinal adjuster according to claim 8, wherein:
    the stop plate includes edges that extend in the longitudinal direction and are spaced apart from one another in the lateral direction;
    the projections respectively project from proximate the edges of the stop plate;
    mounting points of the stop plate, which are for mounting the stop plate to the first seat rail and structure of the vehicle, are positioned between the edges of the stop plate and are successively arranged in the longitudinal direction; and the engagement member includes projections that are spaced apart from one another in the lateral direction, and the projections of the engagement member respectively include the second stop surfaces.

10. A longitudinal adjuster for a vehicle seat, the longitudinal adjuster comprising:
   an elongate first seat rail that extends in a longitudinal direction;
   an elongate second seat rail that extends in the longitudinal direction and is connected to the first seat rail for allowing relative movement between the first and second seat rails in the longitudinal direction;
   a stop plate that is mounted to the first seat rail at a predetermined location for being stationary with respect to the first seat rail, with the stop plate including first projections that are spaced apart from one another in a lateral direction, and the lateral direction is perpendicular to the longitudinal direction; and
   an engagement member that is mounted to the second seat rail for being stationary with respect to the second seat rail, with the engagement member including second projections which are spaced apart from one another in the lateral direction,
   wherein the first projections respectively directly engage the second projections to limit relative movement between the first and second seat rails in the longitudinal direction.

11. A longitudinal adjuster according to claim 10, wherein:
   the stop plate defines a series of holes which extend therethrough for facilitating the mounting of the stop plate to the first seat rail, and the series of holes is arranged between the first projections with respect to the lateral direction; and
   the engagement member defines a series of holes which extend therethrough for facilitating the mounting of the engagement member to the second seat rail, and the series of holes of the engagement member is arranged between the second projections with respect to the lateral direction.

12. A longitudinal adjuster according to claim 10, wherein:
   the stop plate is selected from the group consisting of
      (a) a first stop plate that is at least configured
         (1) for being mounted to the predetermined location, and
         (2) for establishing a first distance to which relative movement between the first and second seat rails in the longitudinal direction is limited while the first stop plate is mounted to the predetermined location, and
      (b) a second stop plate that is at least configured
         (1) for being mounted to the predetermined location, and
         (2) for establishing a second distance to which relative movement between the first and second seat rails in the longitudinal direction is limited while the second stop plate is mounted to the predetermined location, wherein the first and second distances are different from one another; and the first stop plate is at least configured so that
      (a) the first stop plate can be mounted at the predetermined location in different orientations with respect to the longitudinal direction, with the different orientations including at least
         (1) a first orientation for establishing the first distance to which relative movement between the first and second seat rails in the longitudinal direction is limited while the first stop plate is mounted to the predetermined location in the first orientation, and
         (2) a second orientation for establishing a third distance to which relative movement between the first and second seat rails in the longitudinal direction is limited while the first stop plate is mounted to the predetermined location in the second orientation,
      (b) prior to mounting the first stop plate to the first seat rail, the first stop plate can be rotated 180 degrees to transition the first stop plate between the first and second orientations, and
      (c) the first, second and third distances are each different from one another.

13. A longitudinal adjuster for a vehicle seat, the longitudinal adjuster comprising:
   an elongate first seat rail that extends in a longitudinal direction, an elongate second seat rail that extends in the longitudinal direction and is connected to the first seat rail for moving relative to the first seat rail in the longitudinal direction, and an engagement member that is arranged on the second seat rail, wherein
   the first seat rail includes a stop plate having first stop surfaces,
   the engagement member includes second stop surfaces,
   the first stop surfaces cooperate with the second stop surfaces to limit movement of the second seat rail relative to the first seat rail,
   the first seat rail and the second seat rail cooperatively extend around an interior space,
   the engagement member and the stop elate are positioned in the interior space,
   the engagement member strengthens mutual engagement of the second seat rail and the first seat rail,
   the stop plate includes a plurality of projections that extend into the interior space, and
   threaded holes are respectively defined in the projections.

14. A longitudinal adjuster according to claim 13, further comprising means for mounting, wherein the means for mounting are respectively disposed in the holes.

15. A longitudinal adjuster according to claim 10, wherein:
   the first seat rail and the second seat rail cooperatively extend around an interior space, and
   the first stop surfaces and the second stop surfaces are positioned in the interior space.

16. A longitudinal adjuster according to claim 15, wherein the engagement member strengthens mutual engagement of the second seat rail and the first seat rail.

* * * * *